United States Patent
Mezaki et al.

(10) Patent No.: US 12,036,785 B2
(45) Date of Patent: *Jul. 16, 2024

(54) IMAGE FORMING APPARATUS, IMAGE FORMING METHOD, AND STORAGE MEDIUM

(71) Applicants: Daisuke Mezaki, Kanagawa (JP); Yuki Tsuchiya, Kanagawa (JP); Yuusuke Matsuki, Kanagawa (JP); Kiyoshi Tsukamura, Kanagawa (JP)

(72) Inventors: Daisuke Mezaki, Kanagawa (JP); Yuki Tsuchiya, Kanagawa (JP); Yuusuke Matsuki, Kanagawa (JP); Kiyoshi Tsukamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 190 days.

This patent is subject to a terminal disclaimer.

(21) Appl. No.: 17/699,809

(22) Filed: Mar. 21, 2022

(65) Prior Publication Data

US 2022/0314658 A1    Oct. 6, 2022

(30) Foreign Application Priority Data

Mar. 30, 2021    (JP) ................................. 2021-058756
Nov. 2, 2021    (JP) ................................. 2021-179284

(51) Int. Cl.
*B41J 11/00*    (2006.01)
*B41J 2/21*    (2006.01)
(Continued)

(52) U.S. Cl.
CPC ....... *B41J 11/00214* (2021.01); *B41J 2/2107* (2013.01); *B41M 7/0081* (2013.01); *C09D 11/322* (2013.01); *C09D 11/52* (2013.01)

(58) Field of Classification Search
CPC .............. B41J 11/00214; B41J 2/2107; B41M 7/0081; C09D 11/322; C09D 11/52; C09D 11/101

See application file for complete search history.

(56) References Cited

U.S. PATENT DOCUMENTS

2006/0233578 A1    10/2006    Maki et al.
2010/0302327 A1    12/2010    Tsukamura
(Continued)

FOREIGN PATENT DOCUMENTS

JP    2013-230626    11/2013
JP    2019-069593    5/2019

OTHER PUBLICATIONS

U.S. Appl. No. 17/440,803, filed Sep. 20, 2021, Yosuke Saito, et al.

*Primary Examiner* — Lisa Solomon
(74) *Attorney, Agent, or Firm* — Duft & Bornsen, PC

(57) ABSTRACT

An image forming apparatus includes a metallic ink discharge head, a color ink discharge head, an irradiation unit, a carriage, and a moving unit. The metallic ink discharge head discharges a metallic ink onto a recording medium. The color ink discharge head discharges a color ink onto the recording medium. The irradiation unit irradiates the metallic ink with light. The metallic ink discharge head, the color ink discharge head, and the irradiation unit are mounted on the carriage. The moving unit alternately perform a main scanning movement and a sub-scanning movement. The metallic ink discharge head discharges the metallic ink in a region of the recording medium in a former main scanning movement. The irradiation unit irradiates the region with the light in a latter main scanning movement. The color ink discharge head discharges the color ink in the region irradiated with the light by the irradiation unit.

11 Claims, 10 Drawing Sheets

(51) Int. Cl.
  *B41M 7/00*    (2006.01)
  *C09D 11/322*  (2014.01)
  *C09D 11/52*   (2014.01)

(56) References Cited

U.S. PATENT DOCUMENTS

| | | |
|---|---|---|
| 2013/0155158 A1 | 6/2013 | Tsukamura et al. |
| 2013/0328955 A1* | 12/2013 | Utsunomiya .......... B41J 11/008 347/12 |
| 2013/0335495 A1* | 12/2013 | Umebayashi ........ B41M 5/0029 347/102 |
| 2014/0043386 A1* | 2/2014 | Saita .................. B41J 11/00214 347/15 |
| 2016/0193858 A1 | 7/2016 | Tsuchiya |
| 2018/0207956 A1 | 7/2018 | Mezaki |
| 2019/0270316 A1 | 9/2019 | Tsuchiya |
| 2019/0275810 A1 | 9/2019 | Matsuki et al. |
| 2020/0276833 A1 | 9/2020 | Mezaki |
| 2021/0031541 A1 | 2/2021 | Mezaki |
| 2022/0016916 A1 | 1/2022 | Saito et al. |

\* cited by examiner

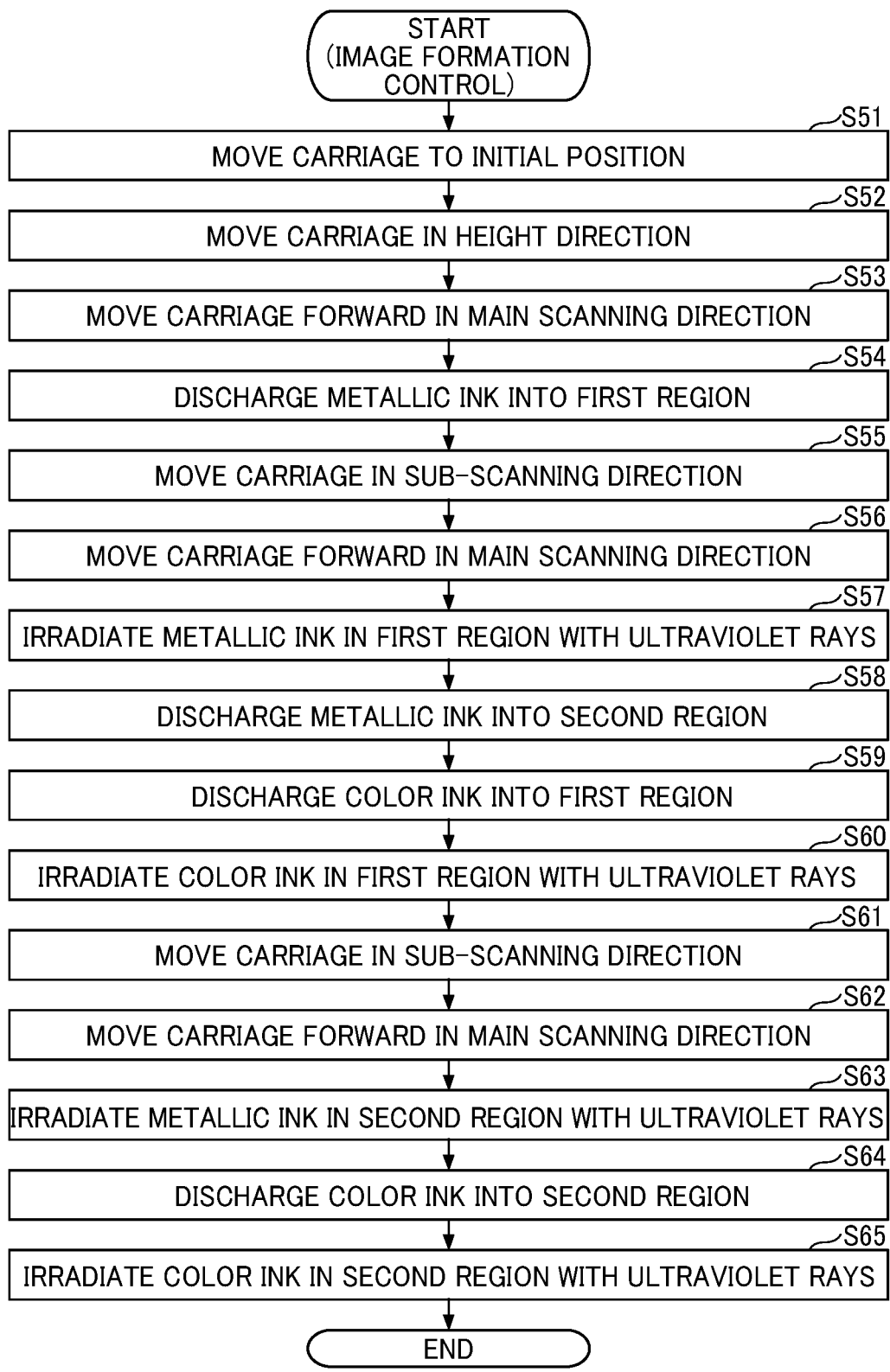

COMPARATIVE EXAMPLE

IMAGE FORMING APPARATUS, IMAGE FORMING METHOD, AND STORAGE MEDIUM

CROSS-REFERENCE TO RELATED APPLICATIONS

This patent application is based on and claims priority pursuant to 35 U.S.C. § 119(a) to Japanese Patent Application Nos. 2021-058756, filed on Mar. 30, 2021 and 2021-179284, filed on Nov. 2, 2021, in the Japan Patent Office, the entire disclosure of each of which is hereby incorporated by reference herein.

BACKGROUND

Technical Field

Embodiments of the present disclosure relate to an image forming apparatus, an image forming method, and a storage medium for performing the image forming method.

Related Art

There is known an image forming apparatus including a liquid discharge head that discharges liquid while moving relative to a recording medium in a main scanning direction and a sub-scanning direction perpendicular to the main scanning direction to form an image on the recording medium.

SUMMARY

Embodiments of the present disclosure describe an improved image forming apparatus that includes a metallic ink discharge head, a color ink discharge head, an irradiation unit, a carriage, and a moving unit. The metallic ink discharge head discharges a metallic ink onto a recording medium. The color ink discharge head discharges a color ink onto the recording medium. The irradiation unit irradiates the metallic ink on the recording medium with light. The metallic ink discharge head, the color ink discharge head, and the irradiation unit are mounted on the carriage. The moving unit alternately perform a main scanning movement in which the carriage is moved relative to the recording medium in a main scanning direction and a sub-scanning movement in which the carriage is moved relative to the recording medium in a sub-scanning direction perpendicular to the main scanning direction. The metallic ink discharge head discharges the metallic ink in a region of the recording medium in a former main scanning movement. The irradiation unit irradiates the region in which the metallic ink has been discharged, with the light in a latter main scanning movement after the former main scanning movement. The color ink discharge head discharges the color ink in the region irradiated with the light by the irradiation unit.

According to other embodiments of the present disclosure, there are provided an image forming method and a non-transitory storage medium storing program codes which, when executed by one or more processors, cause the one or more processors to perform the image forming method. The image forming method includes discharging a metallic ink onto a recording medium, discharging a color ink onto the recording medium, irradiating the metallic ink on the recording medium with light, and alternately performing a main scanning movement and a sub-scanning movement. In the main scanning movement, positions where the metallic ink and the color ink are discharged and where the light is emitted are moved relative to the recording medium in a main scanning direction. In the sub-scanning movement, the positions where the metallic ink and the color ink are discharged and where the light is emitted are moved relative to the recording medium in a sub-scanning direction perpendicular to the main scanning direction. The image forming method further includes discharging the metallic ink in a region of the recording medium in a former main scanning movement, irradiating the region in which the metallic ink has been discharged, with the light in a latter main scanning movement after the former main scanning movement, and discharging the color ink in the region irradiated with the light.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 is a flowchart illustrating an operation of the image forming apparatus according to the present embodiment;

Figure 1A:
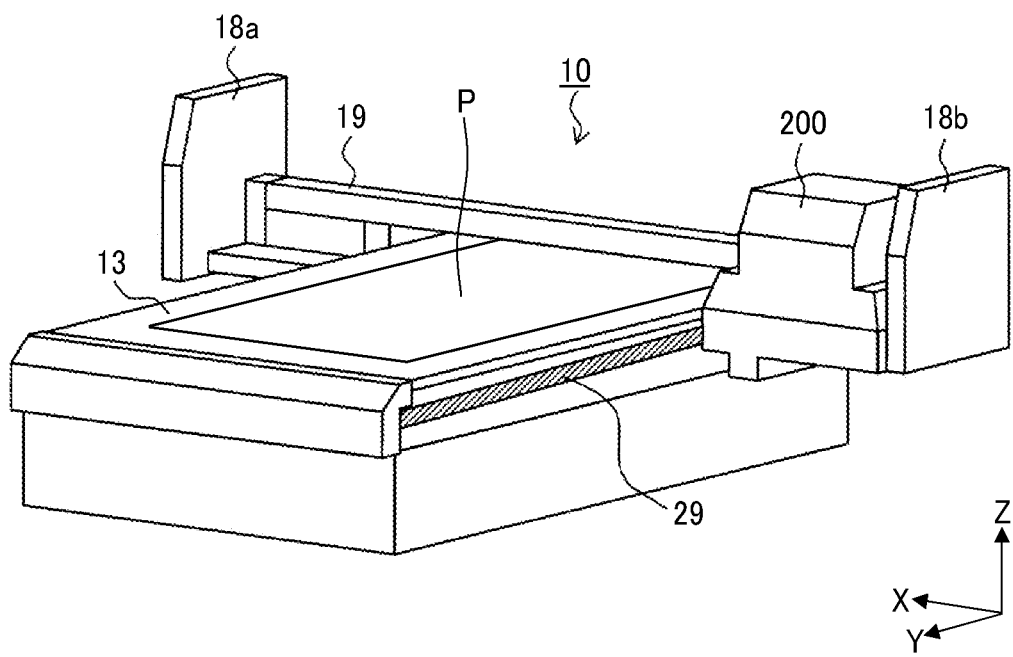
FIG. 1A is a perspective front view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. In addition, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected, and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to drawings. In each of the drawings, the same reference codes are allocated to components or portions having the same configuration, and redundant descriptions of the same components may be omitted.

Further, the embodiments described below are some examples of an image forming apparatus for embodying the technical idea of the present disclosure, and embodiments of the present disclosure are not limited to the embodiments described below. The dimensions, materials, and shapes of components, relative arrangements thereof, and the like described below are not intended to limit the scope of the present disclosure thereto but are intended to exemplify the present disclosure unless otherwise specified. The size, positional relation, and the like of components illustrated in the drawings may be exaggerated for clarity of description.

An image forming apparatus according to an embodiment of the present disclosure includes a metallic ink discharge head, a color ink discharge head, an irradiation unit, a carriage, and a moving unit. The metallic ink discharge head discharges a metallic ink onto a recording medium. The color ink discharge head discharges a color ink onto the recording medium. The irradiation unit irradiates the metallic ink on the recording medium with light. The metallic ink discharge head, the color ink discharge head, and the irradiation unit are mounted on the carriage. The moving unit alternately performs a main scanning movement and a sub-scanning movement. In the main scanning movement, the carriage is moved relative to the recording medium in a main scanning direction. In the sub-scanning movement, the carriage is moved relative to the recording medium in a sub-scanning direction perpendicular to the main scanning direction.

The metallic ink is ultraviolet curable, for example, and the irradiation unit emits ultraviolet rays to cure the metallic ink.

In the present embodiment, the metallic ink discharge head discharges the metallic ink in a region of the recording medium in a former main scanning movement. Then, the irradiation unit irradiates the region in which the metallic ink has been discharged, with the light in a latter main scanning movement after the former main scanning movement. The color ink discharge head discharges the color ink in the region irradiated with the light by the irradiation unit. As a result, a long time can be secured from the discharge of the metallic ink to the start of curing the metallic ink, and a colored and highly glossy image such as a metallic color image can be formed. Here, the term "metallic" refers to gloss like metal.

An inkjet image forming apparatus is described below as an example according to the present embodiment. The inkjet image forming apparatus discharges ultraviolet curable ink onto a sheet to form an image. Here, the ink is an example of liquid, and the sheet is an example of a recording medium. The sheet includes various types of paper such as plain paper and gloss paper. The recording medium is not limited to paper, and may be a plastic film, prepreg, silver foil, or the like.

Note that image formation, recording, printing, image printing, and print in the terms of the embodiments are synonymous. Further, the term "liquid" includes any liquid having a viscosity or a surface tension that can be discharged from the liquid discharge head. However, preferably, the viscosity of the liquid is not greater than 30 mPa·s under ordinary temperature and ordinary pressure or by heating or cooling.

Examples of the liquid include a solution, a suspension, or an emulsion including, for example, a solvent, such as water or an organic solvent, a colorant, such as dye or pigment, a functional material, such as a polymerizable compound, a resin, or a surfactant, a biocompatible material, such as DNA, amino acid, protein, or calcium, and an edible material, such as a natural colorant. Such a solution, a suspension, or an emulsion can be used for, e.g., inkjet ink; surface treatment liquid; a liquid for forming an electronic element component, a light-emitting element component, or an electronic circuit resist pattern; or a material solution for three-dimensional fabrication.

The "liquid discharge head" is a functional component that discharges and jets the liquid from nozzles. Examples of an energy source for generating energy to discharge the liquid include a piezoelectric actuator (a laminated piezoelectric element or a thin-film piezoelectric element), a thermal actuator that employs a thermoelectric conversion element, such as a thermal resistor, and an electrostatic actuator including a diaphragm and opposed electrodes.

In the following description, a main scanning direction is defined as an X-axis direction, a sub-scanning direction substantially perpendicular to the main scanning direction is defined as a Y-axis direction, and a direction perpendicular to both the X-axis direction and the Y-axis direction is defined as a Z-axis direction. Note that a direction indicated by the arrow in the X-axis direction is referred to as +X direction, a direction opposite to +X direction is referred to as −X direction, a direction indicated by the arrow in the Y-axis direction is referred to as +Y direction, a direction opposite to +Y direction is referred to as −Y direction, a direction indicated by the arrow in the Z-axis direction is referred to as +Z direction, and a direction opposite to +Z direction is referred to as −Z direction. However, these directions do not limit the orientation of the image forming apparatus, and the image forming apparatus can be oriented in arbitrary direction.

Figure 1B:
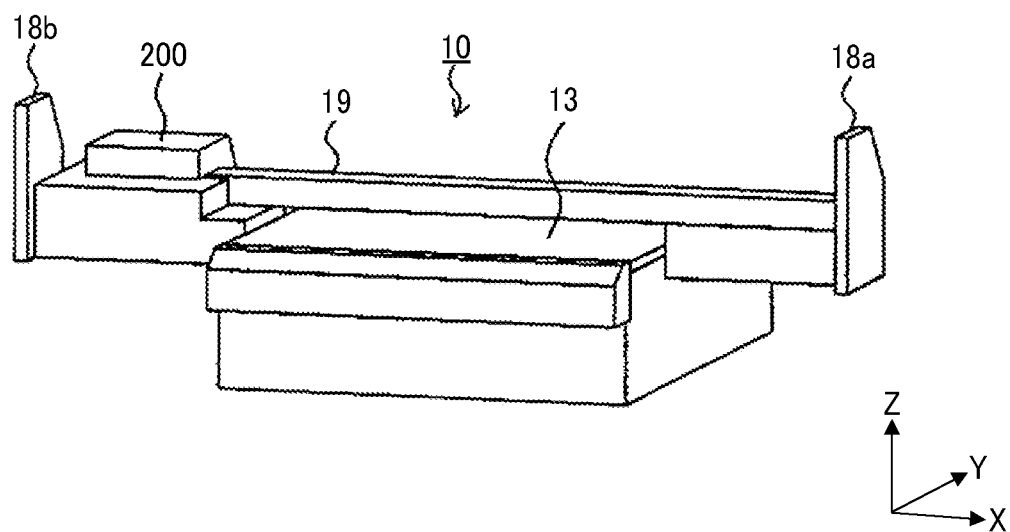
FIG. 1B is a perspective rear view of the image forming apparatus according to the present embodiment.

First, an overall configuration of an image forming apparatus 10 according to an embodiment of the present disclosure is described. FIGS. 1A and 1B are perspective views illustrating an example of the overall configuration of the image forming apparatus 10 according to the present embodiment. FIG. 1A is a perspective front view of the image forming apparatus 10, and FIG. 1B is a perspective rear view of the image forming apparatus 10.

Figure 2:
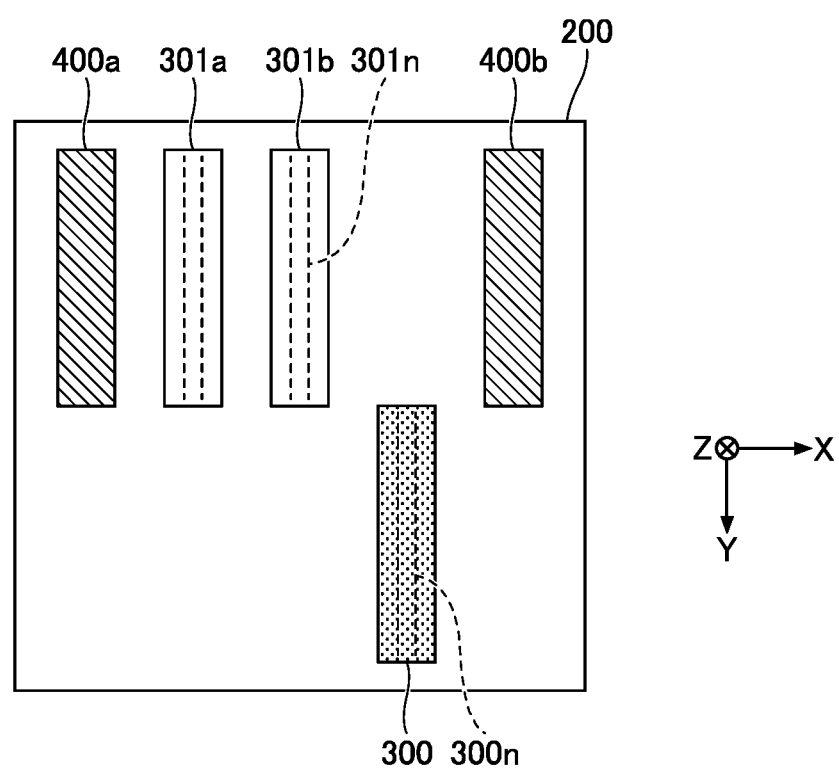
FIG. 2 is a plan view of a carriage according to the present embodiment.

The image forming apparatus 10 includes a carriage 200 and a sheet table 13 on which a sheet P is placed. An ink discharge head (e.g., a metallic ink discharge head 300 and color ink discharge heads 301*a* and 301*b* as illustrated in FIG. 2) and an irradiation unit (e.g., irradiation units 400*a* and 400*b* as illustrated in FIG. 2) are mounted on the carriage 200. The ink discharge head discharges ink from the nozzles to form an image. The nozzles face the sheet table 13. The irradiation unit also faces the sheet table 13. The ink discharge head and the irradiation unit is described in detail later with reference to FIG. 2.

A guide rod 19 is bridged between left and right side plates 18*a* and 18*b*. The guide rod 19 movably holds the carriage 200 in the X-axis direction. The carriage 200 moves in the main scanning direction relative to the sheet P along the guide rod 19 (i.e., a main scanning movement). The carriage 200, the guide rod 19, and the side plates 18*a* and 18*b* are combined as a single body and movable together in the Y-axis direction along a guide rail 29 disposed below the sheet table 13. The carriage 200 moves in the sub-scanning direction relative to the recording medium along the guide rail 29 (i.e., a sub-scanning movement). Further, the carriage 200 is movably held in the Z-axis direction (vertical direction). The image forming apparatus 10 performs one-way printing in which an image is formed while the carriage 200 moves forward, that is, in the main scanning movement in +X direction (i.e., a forward main scanning movement).

Next, a configuration of the carriage 200 is described with reference to FIG. 2. FIG. 2 is a plan view illustrating an example of the configuration of the carriage 200. In FIG. 2, the carriage 200 illustrated in FIG. 1 is viewed in +Z direction. The carriage 200 has a box shape that is open in −Z direction. As illustrated in FIG. 2, the carriage 200 includes, inside the box shape, the metallic ink discharge head 300, the color ink discharge heads 301a and 301b, and the irradiation units 400a and 400b.

Note that the color ink discharge heads 301a and 301b have the same configuration except for the color of ink to be discharged and the position where each of the color ink discharge heads 301a and 301b is disposed. Therefore, the color ink discharge heads 301a and 301b are collectively referred to as the color ink discharge heads 301, and each of the color ink discharge heads 301a and 301b is simply referred to as the color ink discharge head 301 unless otherwise distinguished. Similarly, since the irradiation units 400a and 400b have the same configuration except for the position where each of the irradiation units 400a and 400b is disposed, the irradiation units 400a and 400b are collectively referred to as the irradiation units 400, and each of the irradiation units 400a and 400b is simply referred to as the irradiation unit 400 in the following description unless otherwise distinguished. The metallic ink discharge head 300 also has the same configuration as the color ink discharge head 301 except for the type of ink to be discharged and the position thereof, but do not necessarily have the same configuration.

The carriage 200 holds the metallic ink discharge head 300, the color ink discharge heads 301, and the irradiation units 400 each of which faces the sheet P placed below the carriage 200 in −Z direction.

The metallic ink discharge head 300 is an example of a liquid discharge head including a nozzle row in which a plurality of nozzles is arranged in the sub-scanning direction to discharge metallic ink onto the sheet P. The metallic ink discharge head 300 includes a piezoelectric element as a pressure generator. The piezoelectric element is contracted in response to drive signals, thereby changing the pressure of the metallic ink in the metallic ink discharge head 300. Accordingly, the metallic ink is discharged in −Z direction through each nozzle included in a nozzle row 300n of the metallic ink discharge head 300.

The metallic ink according to the present embodiment is an ultraviolet curable ink and includes at least a monomer or an oligomer, a photopolymerization initiator, and metallic particles. For example, an ink containing a methacrylate monomer can be used as the ultraviolet curable ink. Methacrylate monomer has characteristics of relatively weak skin sensitization and large cure shrinkage. The ultraviolet curable ink may further include an additive. Examples of the additive includes a sensitizer, a dispersant, a leveling agent, or a polymerization inhibitor, and the additive can be appropriately selected. In the present embodiment, the metallic particles are made of aluminum and has a scaly or flat shape having an outer diameter of about 5 μm and a thickness of about 0.1 μm to 0.2 μm. The metallic particles are not limited thereto, and metal other than aluminum can be used as the material of the metallic particles. The shape of the metallic particles is not limited to be scaly or flat.

The color ink discharge head 301 includes a nozzle row in which a plurality of nozzles is arranged in the sub-scanning direction to discharge color ink onto the sheet P. The color ink discharge head 301 includes a piezoelectric element as a pressure generator. The piezoelectric element is contracted in response to drive signals, thereby changing the pressure of the color ink in the color ink discharge head 301. Accordingly, the color ink is discharged in −Z direction through each nozzle included in a nozzle row 301n of the color ink discharge head 301.

The color ink according to the present embodiment is an ultraviolet curable ink and includes at least a monomer or an oligomer, a photopolymerization initiator, and colored particles. The colored particles are particles of a dye, a pigment, or the like. The colors of the colored particles are, for example, cyan, magenta, yellow, and black, but are not limited thereto, and can be appropriately selected according to the use of the image forming apparatus 10.

The material of the ultraviolet curable ink is not particularly limited to the above, and various materials can be appropriately used according to the use of the image forming apparatus 10. The same applies to the viscosity and surface tension of the ink. At least one of the metallic ink or the color ink preferably includes a solvent to increase volatility and improve curing efficiency or drying efficiency. At least one of the metallic ink or the color ink preferably includes water from the viewpoint of environmental resistance.

The irradiation unit 400 irradiates the metallic ink and the color ink on the sheet P with light. In the present embodiment, the irradiation unit 400 emits ultraviolet rays to cure the metallic ink and the color ink on the sheet P. The cured metallic ink and color ink are adhered to and fixed on the sheet P. As the irradiation unit 400, for example, an ultraviolet (UV) lamp can be used.

The length of the irradiation unit 400 in the sub-scanning direction is preferably longer than each length of the metallic ink discharge head 300 and the color ink discharge head 301 in the sub-scanning direction. Thus, the irradiation unit 400 can irradiate the entire ink discharged by the metallic ink discharge head 300 or the color ink discharge head 301 onto the sheet P in the sub-scanning direction with ultraviolet rays in one main scanning movement.

As illustrated in FIG. 2, in the carriage 200, the irradiation unit 400a, the color ink discharge head 301a, the color ink discharge head 301b, the metallic ink discharge head 300, and the irradiation unit 400b are disposed in this order from the upstream side to the downstream side in the forward main scanning movement in +X direction. The color ink discharge heads 301a and 301b are arranged side by side in the main scanning direction.

The metallic ink discharge head 300 is disposed downstream from the color ink discharge heads 301 in +Y direction along the sub-scanning direction and shifted by approximately a predetermined sub-scanning distance in the sub-scanning direction from the position where the color ink discharge heads 301 are disposed. The sub-scanning distance is substantially equal to the lengths of the nozzle rows 300n and 301n in the sub-scanning direction. The sub-scanning distance is an example of a predetermined distance.

The color ink discharge heads 301 and the irradiation units 400 are arranged side by side in the main scanning direction while overlapping each other in the sub-scanning direction. The metallic ink discharge head 300 and the irradiation units 400 do not overlap each other in the sub-scanning direction. Specifically, the metallic ink discharge head 300 is disposed downstream from the irradiation unit 400 in +Y direction along the sub-scanning direction and shifted by the sub-scanning distance from the position where the irradiation unit 400 is disposed.

Figure 3:
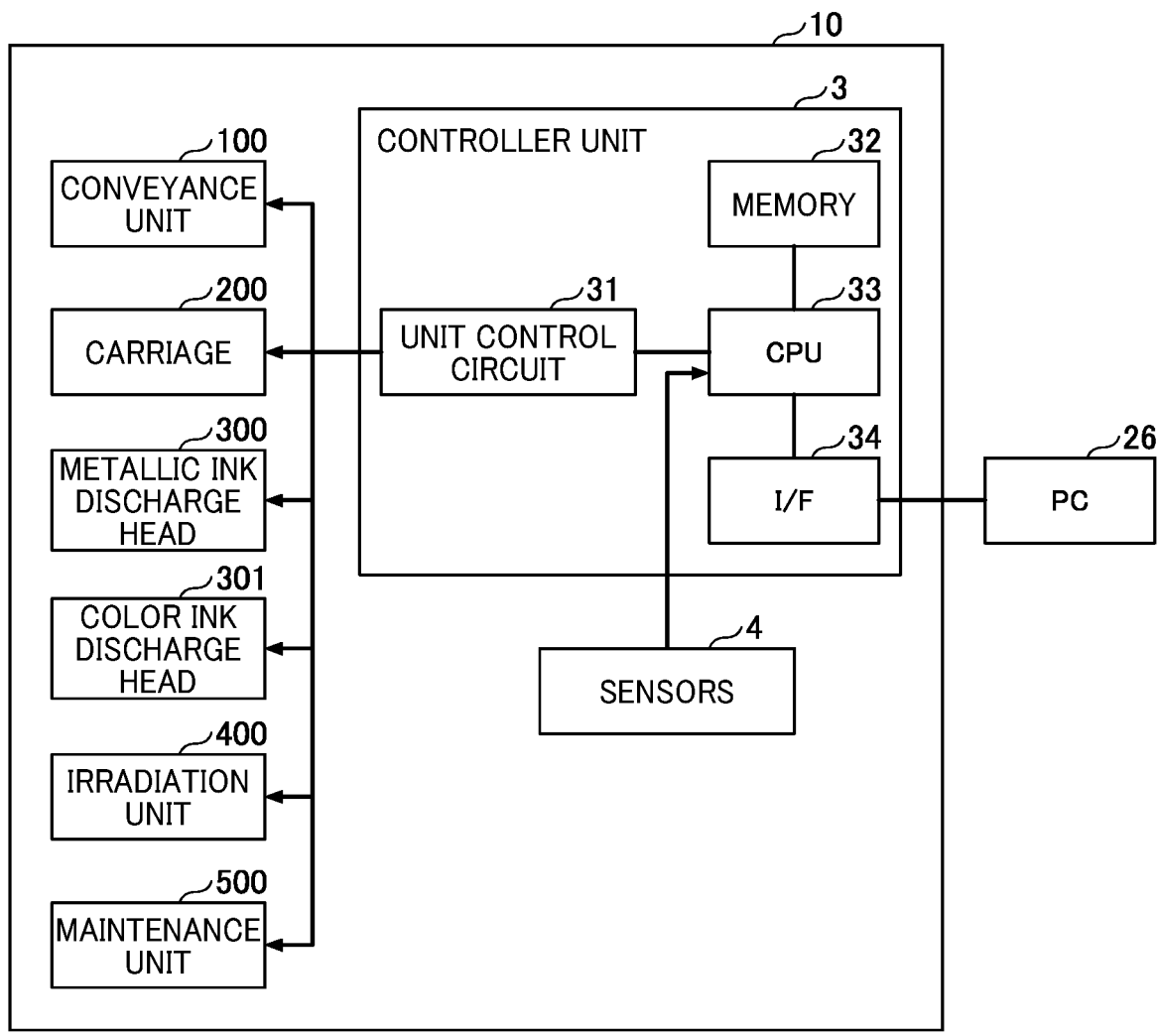
FIG. 3 is a block diagram illustrating a configuration of hardware of the image forming apparatus according to the present embodiment.

Next, a configuration of hardware of the image forming apparatus 10 is described with reference to FIG. 3. FIG. 3 is a block diagram illustrating the configuration of hardware of the image forming apparatus 10. As illustrated in FIG. 3, the image forming apparatus 10 includes a controller unit 3, sensors 4, a conveyance unit 100, the carriage 200, the metallic ink discharge head 300, the color ink discharge head 301, the irradiation unit 400, and a maintenance unit 500.

The controller unit 3 includes a unit control circuit 31, a memory 32, a central processing unit (CPU) 33, and an interface (I/F) 34. The I/F 34 connects the image forming apparatus 10 to a personal computer (PC) 26 as an external device. The image forming apparatus 10 and the PC 26 may be connected in any form, for example, via a network or directly connected by a communication cable.

The CPU 33 uses the memory 32 as a working area to control an operation of each unit of the image forming apparatus 10 such as the conveyance unit 100, the carriage 200, the metallic ink discharge head 300, the color ink discharge head 301, the irradiation unit 400, and the maintenance unit 500 via the unit control circuit 31. Specifically, the CPU 33 controls the operation of each unit based on image data received from the PC 26 and data detected by the sensors 4 to form an image on the sheet P.

The sensors 4 includes various sensors provided in the image forming apparatus 10, for example, an encoder sensor that detects the position of the carriage 200 in the main scanning direction. A printer driver is installed in the PC 26. The printer driver generates image data to be transmitted to the image forming apparatus 10. The image data includes command data for operating the carriage 200 of the image forming apparatus 10 and pixel data related to an image to be formed.

The conveyance unit 100 includes a conveyance mechanism to convey the sheet P. The conveyance unit 100 is an example of a moving unit that performs the main scanning movement in which the carriage 200 is moved relative to the sheet P in the main scanning direction and the sub-scanning movement in which the carriage 200 is moved relative to the sheet P in the sub-scanning direction. The conveyance unit 100 includes the guide rod 19, the guide rail 29, and the like.

The maintenance unit 500 maintains and recovers the discharge function of the metallic ink discharge head 300 and the color ink discharge head 301. The maintenance unit 500 further includes a cap that covers the nozzle surface of the metallic ink discharge head 300 and the color ink discharge head 301 to protect the nozzles from drying when the image forming apparatus 10 does not form an image. The cap is a moisture-retentive cap having a function of simply covering the nozzle surface to protect the nozzle surface from drying. Alternatively, the cap may be a suction cap coupled to a suction pump. In addition to the function of the moisture-retentive cap, the suction cap sucks thickened ink from the metallic ink discharge head 300 and the color ink discharge head 301 by the suction pump.

Figure 4:
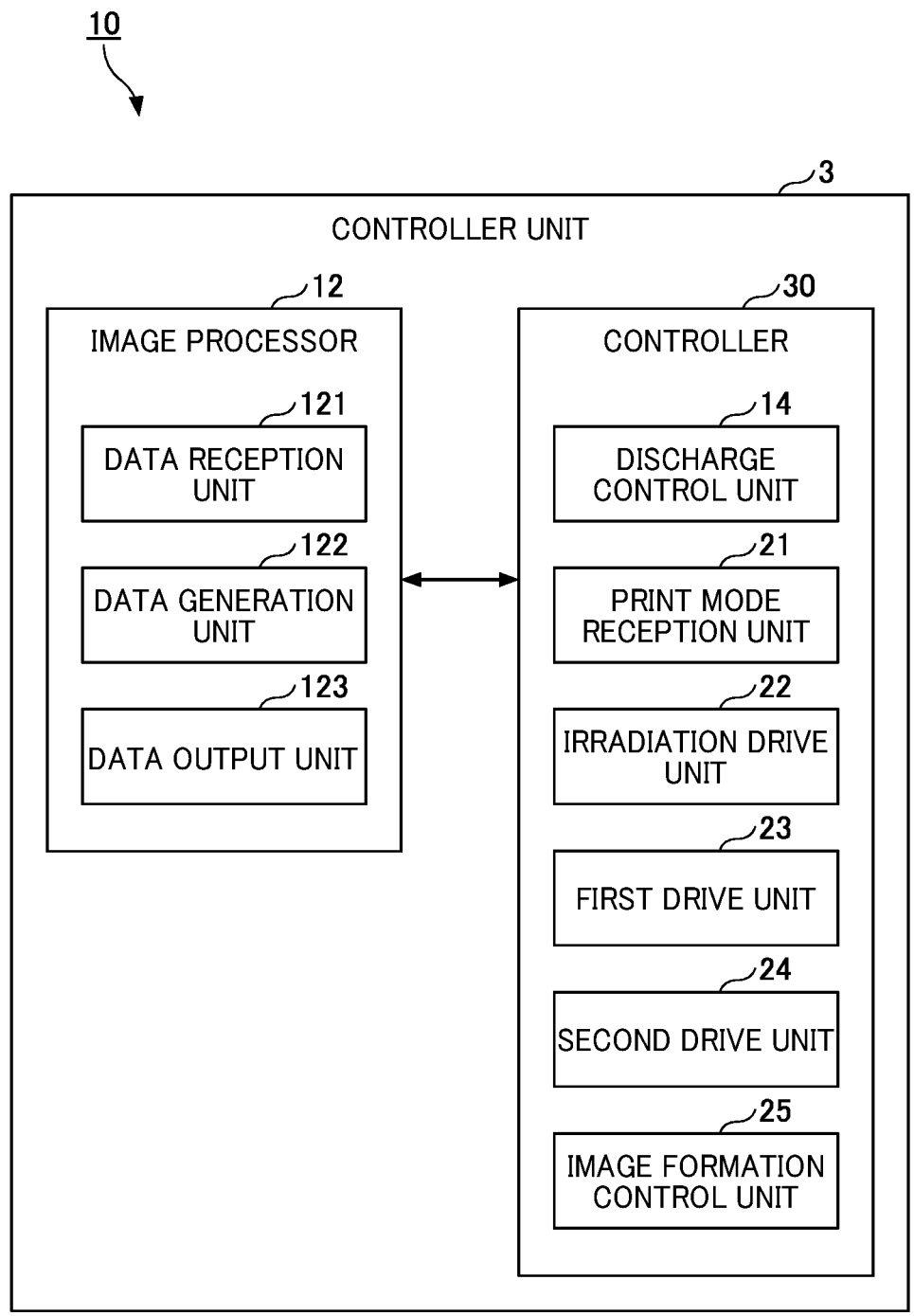
FIG. 4 is a block diagram illustrating a functional configuration of a controller unit according to the present embodiment.

Next, a functional configuration of the controller unit 3 included in the image forming apparatus 10 is described. FIG. 4 is a block diagram illustrating an example of the functional configuration of the controller unit 3. As illustrated in FIG. 4, the controller unit 3 includes an image processor 12 and a controller 30. The image processor 12 includes a data reception unit 121, a data generation unit 122, and a data output unit 123.

The data reception unit 121 receives image data from the PC 26. The image data includes information indicating a pattern and color of an image to be formed. The data generation unit 122 performs predetermined data processing such as color (cyan, magenta, yellow, and black) conversion processing, gradation reduction processing, and image conversion processing on the image data received by the data reception unit 121, and generates recording data for forming an image on the sheet P based on the image data. The data output unit 123 outputs the generated recording data to the controller 30.

The controller 30 includes a discharge control unit 14, a print mode reception unit 21, an irradiation drive unit 22, a first drive unit 23, a second drive unit 24, and an image formation control unit 25.

The discharge control unit 14 causes the metallic ink discharge head 300 and the color ink discharge head 301 to discharge ink based on the recording data. The print mode reception unit 21 receives data of a print mode. The print mode indicates color printing or monochrome printing, printing on one side or both sides of the sheet P, or the like. The irradiation drive unit 22 drives the irradiation unit 400 to emit ultraviolet rays.

The first drive unit 23 causes the conveyance unit 100 to move the carriage 200 in the sub-scanning direction so as to move the carriage 200 and the sheet P relative to each other in the sub-scanning direction. The second drive unit 24 causes the conveyance unit 100 to move the carriage 200 in the main scanning direction so as to move the carriage 200 and the sheet P relative to each other in the main scanning direction.

The image formation control unit 25 receives recording data from the image processor 12, and controls the discharge control unit 14, the irradiation drive unit 22, the first drive unit 23, and the second drive unit 24 to cause the metallic ink discharge head 300 and the color ink discharge head 301 to discharge inks corresponding to each pixel of the recording data.

Next, an operation of the image forming apparatus 10 is described with reference to FIG. 5. FIG. 5 is a flowchart illustrating an example of the operation of the image forming apparatus 10. FIG. 5 illustrates the operation triggered by a timing to start image formation control after the image forming apparatus 10 receives image data from the PC 26 and recording data is generated. FIG. 5 illustrates the operation when the image forming apparatus 10 forms an image in three main scanning movements, for example.

First, in step S51, the image formation control unit 25 moves the carriage 200 in the sub-scanning direction and stops the carriage 200 at an initial position for forming an image. Subsequently, in step S52, the image formation control unit 25 drives a lift to move the carriage 200 to a height suitable for discharging ink by the metallic ink discharge head 300 and the color ink discharge head 301. The height means a position of the carriage 200 in the Z-axis direction. At this height, for example, a gap between the sheet P and, the metallic ink discharge head 300 and the color ink discharge head 301 is 1 mm. The image formation control unit 25 preferably drives the lift based on detection signals from a height sensor that detects the height of the metallic ink discharge head 300 and the color ink discharge head 301.

In step S53, the image formation control unit 25 moves the carriage 200 forward in the main scanning direction (i.e., +X direction), in other words, performs the first main scanning movement in +X direction. In the first main scanning movement, in step S54, the metallic ink discharge head 300 discharges the metallic ink in a first region of the sheet P. After the first main scanning movement ends, the image formation control unit 25 stops the carriage 200, then moves the carriage 200 backward in the main scanning direction (i.e., −X direction), returns the carriage 200 to the original position in the main scanning direction, and stops the carriage 200. In one-way printing, the metallic ink discharge head 300 and the color ink discharge head 301 do not discharge ink in the main scanning movement in −X direction (i.e., a backward main scanning movement).

In step S55, the image formation control unit 25 moves the carriage 200 in the sub-scanning direction by the sub-scanning distance. In step S56, the image formation control unit 25 moves the carriage 200 forward in the main scanning direction as a second main scanning movement. In the second main scanning movement, in step S57, the irradiation unit 400b irradiates the metallic ink discharged in the first region of the sheet P with ultraviolet rays. As a result, the metallic ink discharged in the first region of the sheet P is cured and fixed on the sheet P.

After the image formation control starts, the irradiation unit 400b continuously turns on the UV lamp and continues emitting ultraviolet rays. When the irradiation unit 400b faces the metallic ink discharged in the first region of the sheet P, the irradiation unit 400b irradiates the metallic ink with ultraviolet rays. At that time, the first region and the irradiation unit 400b overlap each other in a direction in which the sheet P is viewed in plan view. The irradiation unit 400b may be controlled such that the UV lamp is turned on only when the irradiation unit 400b faces the metallic ink discharged in the first region of the sheet P, and the UV lamp is turned off in other times. The same applies to the subsequent irradiation of ultraviolet rays described later by the irradiation units 400a and 400b.

Here, the metallic ink discharge head 300 is disposed at a position shifted downstream from the irradiation unit 400b by the sub-scanning distance in +Y direction. Therefore, in the first main scanning movement, the irradiation unit 400b does not face the metallic ink discharged onto the sheet P in the first main scanning movement, and thus the metallic ink is not irradiated with ultraviolet rays.

On the other hand, in the second main scanning movement, since the irradiation unit 400b faces the metallic ink discharged onto the sheet P in the first main scanning movement, the metallic ink is irradiated with ultraviolet rays. In other words, the metallic ink discharge head 300 discharges the metallic ink in the first main scanning movement, and the irradiation unit 400b emits ultraviolet rays in the second main scanning movement after the first main scanning movement.

As a result, a long time is secured from the discharge of the metallic ink, which is discharged in the first region of the sheet P in the first main scanning movement, to the start of curing the metallic ink. The first main scanning movement is an example of a former main scanning movement, and the second main scanning movement is an example of a latter main scanning movement performed after the former main scanning movement.

In the second main scanning movement, in step S58, the metallic ink discharge head 300 discharges the metallic ink in a second region of the sheet P. The second region is shifted by the sub-scanning distance downstream from the first region in +Y direction along the sub-scanning direction. In the second main scanning movement, in step S59, the color ink discharge head 301 discharges the color ink in the first region of the sheet P. Further, in the second main scanning movement, in step S60, the irradiation unit 400a irradiates the color ink discharged in the first region of the sheet P with ultraviolet rays. As a result, the color ink discharged in the first region of the sheet P is cured and fixed on the sheet P.

In other words, in the first main scanning movement, the metallic ink discharge head 300 discharges the metallic ink in a region of the sheet P. In the second main scanning movement, after the irradiation unit 400b irradiates the metallic ink discharged in the region with ultraviolet rays, the color ink discharge head 301 discharges the color ink in the region of the sheet P in which the metallic ink has been discharged.

After the second main scanning movement ends, the image formation control unit 25 stops the carriage 200, then moves the carriage 200 backward in the main scanning direction (i.e., −X direction), returns the carriage 200 to the original position in the main scanning direction, and stops the carriage 200.

In step S61, the image formation control unit 25 moves the carriage 200 in the sub-scanning direction by the sub-scanning distance. In step S62, the image formation control unit 25 moves the carriage 200 forward in the main scanning direction as a third main scanning movement. In the third main scanning movement, in step S63, the irradiation unit 400b irradiates the metallic ink discharged in the second region of the sheet P with ultraviolet rays. Thus, the metallic ink discharged in the second region of the sheet P is cured and fixed on the sheet P.

As a result, a long time is secured from the discharge of the metallic ink, which is discharged in the second region of the sheet P in the second main scanning movement, to the start of curing the metallic ink. In the second region, the second main scanning movement is an example of the former main scanning movement, and the third main scanning movement is an example of the latter main scanning movement performed after the former main scanning movement. Note that the former main scanning movement, in which the metallic ink is discharged, is not limited to the first main scanning movement. Similarly, the latter main scanning movement, in which the metallic ink is irradiated with ultraviolet rays, is not limited to the second main scanning movement.

In the third main scanning movement, in step S64, the color ink discharge head 301 discharges the color ink in the second region of the sheet P. Further, in the third main scanning movement, in step S65, the irradiation unit 400a irradiates the color ink discharged in the second region of the sheet P with ultraviolet rays. Thus, the color ink discharged in the second region of the sheet P is cured and fixed on the sheet P.

As described above, the image forming apparatus 10 can form images in the first and second regions of the sheet P in the three main scanning movements.

Figure 6B:
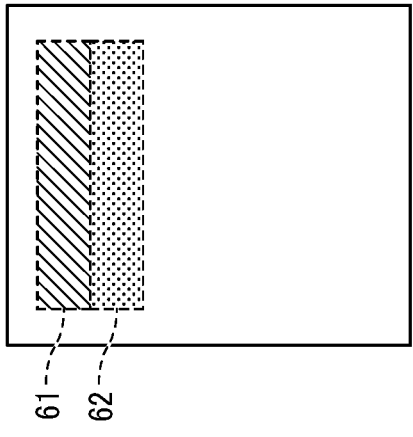
FIGS. 6A to 6C are plan views of a sheet on which images are formed in first to third main scanning movements, respectively.
Figure 6A:
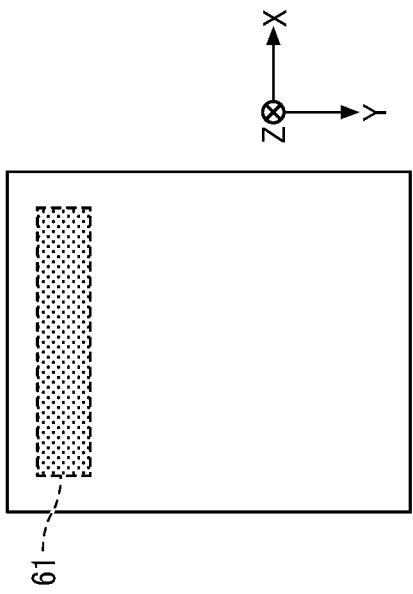
Figure 6C:
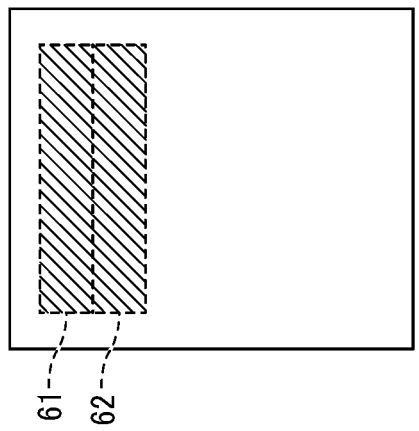

FIGS. 6A to 6C are plan views of the sheet P on which images are formed in first to third main scanning movements, respectively. First, the conveyance unit 100 performs the forward main scanning movement as a first main scanning movement in which the carriage 200 is moved forward in the main scanning direction. At that time, as illustrated in FIG. 6A, the metallic ink discharge head 300 discharges the metallic ink in a first region 61.

After performing the sub-scanning movement, the conveyance unit 100 performs the forward main scanning movement as a second main scanning movement. At that time, the irradiation unit 400b irradiates the metallic ink discharged in the first region 61 with ultraviolet rays. Thus, the metallic ink in the first region 61 is cured.

As illustrated in FIG. 6B, in the second main scanning movement, the metallic ink discharge head 300 discharges the metallic ink in a second region 62 of the sheet P. The color ink discharge head 301 discharges the color ink in the first region 61, and the irradiation unit 400a irradiates the color ink discharged in the first region 61 with ultraviolet rays. Thus, the color ink in the first region 61 is cured. The color ink discharge head 301 may discharge the color ink onto the metallic ink discharged in the first region 61, or may discharge the color ink in an area where the metallic ink is not discharged in the first region 61 to complement the metallic ink.

After performing the sub-scanning movement, the conveyance unit 100 performs the forward main scanning movement as a third main scanning movement. At that time, the irradiation unit 400b irradiates the metallic ink discharged in the second region 62 with ultraviolet rays. Thus, the metallic ink in the second region 62 is cured.

As illustrated in FIG. 6C, in the third main scanning movement, the color ink discharge head 301 discharges the color ink in the second region 62, and the irradiation unit 400a irradiates the color ink discharged in the second region 62 with ultraviolet rays. Thus, the color ink in the second region 62 is cured.

As described above, the image forming apparatus 10 can form images in the first and second regions 61 and 62 of the sheet P in the three main scanning movements. Although FIG. 5 and FIGS. 6A to 6C illustrate an operation of forming images in three main scanning movements, the image forming apparatus 10 can repeat the operations of step S56 to step S61 in FIG. 5 to increase the number of main scanning movements. As a result, the image forming apparatus 10 can form an image in a larger region of the sheet P.

Next, operational effects of the image forming apparatus 10 is described. When an image is formed using an ink such as metallic ink containing metal particles, the glossiness of the metallic ink is preferably improved. In particular, the ultraviolet curable ink is likely to be thick when forming an image, and the glossiness of the image may vary depending on the thickness of the ink. Therefore, there is room for improvement in the glossiness.

As a result of diligent studies on the glossiness of such a metallic ink, the inventor has found that the glossiness of an image is improved by prolonging the time from the discharge of the metallic ink to the irradiation of light by the irradiation unit 400. The reason for this is assumed as follows.

If the metallic ink is irradiated with light immediately after landing on a recording medium (sheet P), the metallic ink is cured in a state immediately after landing on the recording medium. On the other hand, if the time from when the metallic ink lands on the recording medium to when the metallic ink is irradiated with light is prolonged, the metallic ink wets and spreads on the recording medium before being cured. As a result, the metallic ink is likely to be thin when forming an image, and a large number of metal foil pieces included in the metallic ink are likely to be oriented parallel to the recording medium. The image including a large number of metal foil pieces oriented parallel to the recording medium is likely to reflect light in the same direction without scattering the light, thereby improving the glossiness of the image.

Therefore, the image forming apparatus 10 according to the present embodiment includes the metallic ink discharge head 300 (liquid discharge head) that discharges the metallic ink onto the sheet P (recording medium), the irradiation unit 400 that irradiates the metallic ink on the sheet P with ultraviolet rays (light), and the carriage 200 on which the metallic ink discharge head 300 and the irradiation unit 400 are mounted. The metallic ink discharge head 300 includes a nozzle row in which a plurality of nozzles is arranged in the sub-scanning direction.

The image forming apparatus 10 further includes the conveyance unit 100 (moving unit) that alternately performs the main scanning movement in which the carriage 200 is moved relative to the sheet P in the main scanning direction and the sub-scanning movement in which the carriage 200 is moved relative to the sheet P in the sub-scanning direction perpendicular to the main scanning direction.

The metallic ink discharge head 300 discharges the metallic ink in the first main scanning movement (former main scanning movement), and the irradiation unit 400 emits ultraviolet rays in the second main scanning movement (latter main scanning movement) after the first main scanning movement.

Since the metallic ink is irradiated with ultraviolet rays to cure the metallic ink in another main scanning movement after the main scanning movement in which the metallic ink discharge head 300 discharges the metallic ink. Accordingly, the time from the discharge of the metallic ink to the start of curing the metallic ink can be long. As a result, the glossiness of an image including the metallic ink can be improved.

In the present embodiment, a long time from the discharge of the metallic ink to the start of curing the metallic ink can be secured without moving the carriage 200 at a slow speed or stopping the carriage 200. Therefore, the high productivity of image formation can be secured while improving the glossiness of the image.

Further, in the present embodiment, the color ink discharge head 301 that discharges the color ink (colored liquid) onto the sheet P is mounted on the carriage 200. The color ink discharge head 301 is disposed at a position shifted by the sub-scanning distance from the metallic ink discharge head 300 in the sub-scanning direction, and the irradiation unit 400 is disposed at a position shifted by the sub-scanning distance from the metallic ink discharge head 300 in the sub-scanning direction.

Accordingly, the time from when the metallic ink is discharged onto the sheet P to when the metallic ink is irradiated with ultraviolet rays is long. Thereafter, the color ink is discharged onto the region where the metallic ink is irradiated with the ultraviolet rays. As a result, the time from the discharge of the metallic ink to the start of curing the metallic ink can be long, thereby improving the glossiness of an image including the metallic ink and forming a colored and highly glossy image such as a metallic color image.

In the present embodiment, the color ink is discharged in the same main scanning movement in which the metallic ink is irradiated with ultraviolet rays, that is, in the latter main scanning movement. Therefore, the number of main scanning movements can be reduced, and high-gloss image can be formed while increasing the productivity of image formation.

In the present embodiment, the color ink discharge head 301 is shifted from the metallic ink discharge head 300 by the sub-scanning distance in the sub-scanning direction, but not limited thereto. The color ink discharge head 301 may be shifted from the metallic ink discharge head 300 by the integral multiple of the sub-scanning distance in the sub-scanning direction to obtain the same effects described above. Similarly, the irradiation unit 400 may be shifted from the metallic ink discharge head 300 by the integral multiple of the sub-scanning distance in the sub-scanning direction.

In the present embodiment, in the first main scanning movement, the metallic ink discharge head 300 discharges the metallic ink in a region of the sheet P. In the second main scanning movement, after the irradiation unit 400b irradiates the metallic ink discharged in the region with ultraviolet rays, the color ink discharge head 301 discharges the color ink in the region of the sheet P in which the metallic ink has been discharged. As a result, the time from the discharge of the metallic ink to the start of curing the metallic ink can be long, thereby improving the glossiness of an image including the metallic ink and forming a colored and highly glossy image such as a metallic color image.

Figure 7:
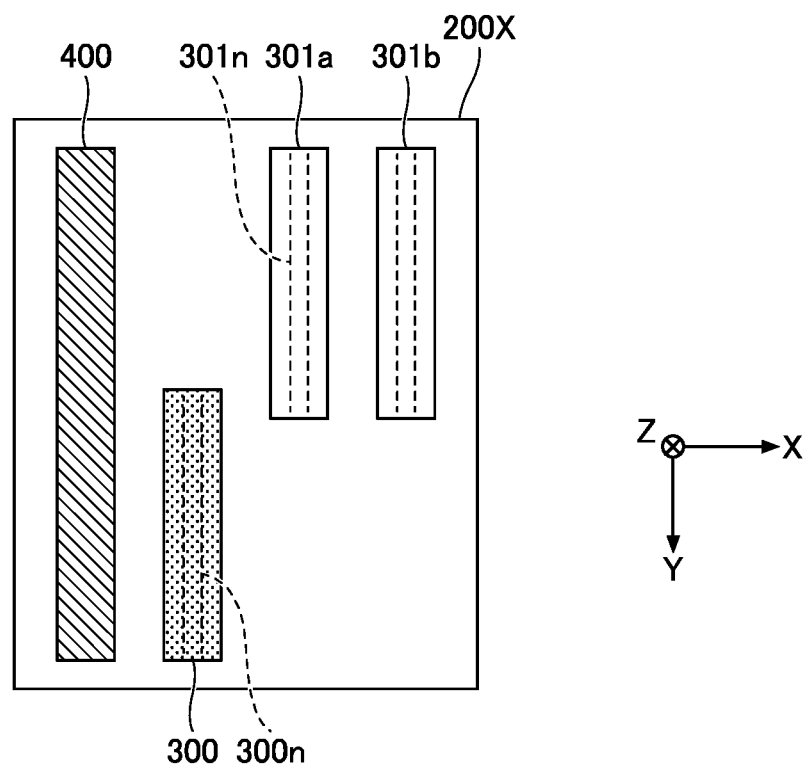
FIG. 7 is a plan view of a carriage according to a comparative example.

FIG. 7 is a plan view of a carriage 200X according to a comparative example. In FIG. 7, components having similar functions to those of the carriage 200 according to the present embodiment are denoted by the same reference numerals for convenience. As illustrated in FIG. 7, in the carriage 200X, the color ink discharge head 301 and the irradiation unit 400 are overlap each other in the sub-scanning direction. Further, the metallic ink discharge head 300 and the irradiation unit 400 are also overlap each other in the sub-scanning direction. With this configuration according to the comparative example, the irradiation unit 400 irradiates the metallic ink discharged onto the sheet P with ultraviolet rays in the same main scanning movement in which the metallic ink discharge head 300 discharges the metallic ink.

In the present embodiment, since ultraviolet rays is emitted in another main scanning movement after the main scanning movement in which the metallic ink discharge head 300 discharges the metallic ink. Accordingly, the time from the discharge of the metallic ink to the start of curing the metallic ink can be longer than that of the comparative example. Therefore, in the present embodiment, the glossiness of the image including the metallic ink can be further improved as compared with the comparative example.

Further, in the present embodiment, a configuration in which ultraviolet curable ink is used has been described as an example, but is not limited thereto. For example, an ink which is cured by light energy such as infrared rays or thermal energy may be used, but the ultraviolet curable ink is preferable from the viewpoint of curing efficiency.

Figure 8:
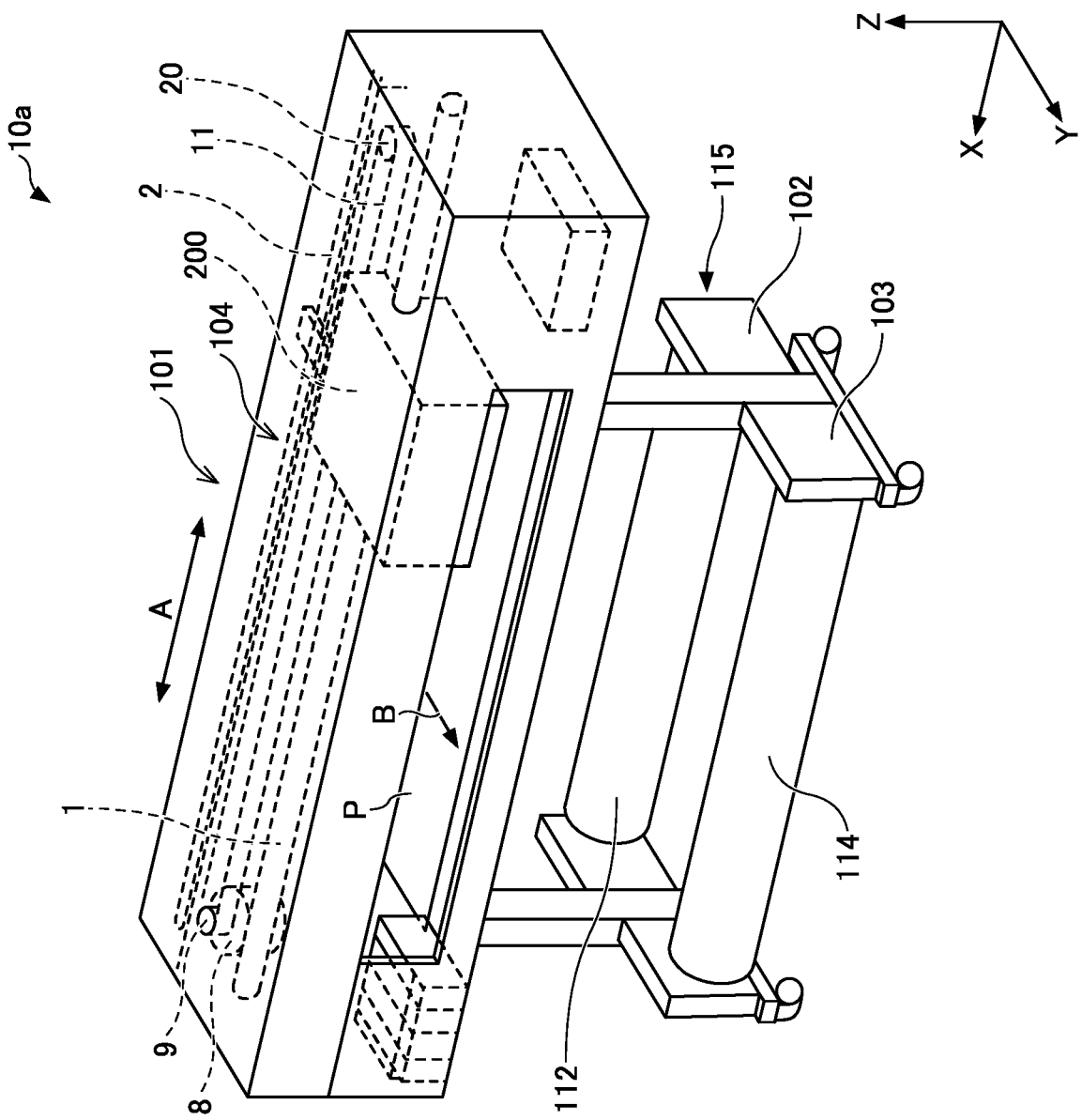
FIG. 8 is a perspective view illustrating another example of the configuration of the image forming apparatus according to the present embodiment.

In the present embodiment, the operation of the image forming apparatus that moves the carriage in both the main scanning direction and the sub-scanning direction has been described as an example, but not limited thereto. For example, the carriage may be moved in the main scanning direction, and the sheet P may be moved in the sub-scanning direction. FIG. 8 is a perspective view illustrating another example of the configuration of such an image forming apparatus. In FIG. 8, an image forming apparatus 10a is viewed from obliquely above, and the interior thereof can be partially seen through the housing thereof As illustrated in FIG. 8, the image forming apparatus 10a includes an apparatus body 101, a feeding device 102, and a winding device 103. The feeding device 102 is a medium supply device that is disposed below the apparatus body 101 and supplies a sheet P wound in a roll shape. The sheet P wound in a roll shape is an example of a recording medium. A roll 112 that is the sheet P wound around a hollow shaft 115 is held in the feeding device 102. The winding device 103 includes a hollow shaft 114 for winding the sheet P. The sheet P is wound around the hollow shaft 114 as a roll 112. Note that the feeding device 102 and the winding device 103 may be integrally formed with the apparatus body 101 instead of being separately formed.

The feeding device 102 supplies the sheet P into the apparatus body 101. In the apparatus body 101, an image forming unit 104 forms an image on the sheet P supplied in a conveyance direction indicated by arrow B. The image forming unit 104 includes a guide rod 1 and a guide stay 2 as guides that are bridged between both side plates. The carriage 200 is supported by the guide rod 1 and the guide stay 2 so as to be movable in the main scanning direction indicated by arrow A. The winding device 103 winds the sheet P on which an image has been formed.

A main scanning motor 8 as a driving source to reciprocate the carriage 200 is disposed on one side in the main scanning direction. The main scanning motor 8 rotates a drive pulley 9. A timing belt 11 is wound around the drive pulley 9 and a driven pulley 20 disposed on the other side in the main scanning direction. A belt holding portion of the carriage 200 is secured to the timing belt 11. As the main scanning motor 8 is driven, the carriage 200 is reciprocated in the main scanning direction.

With the carriage 200 illustrated in FIG. 2, the image forming apparatus 10a having such a configuration can obtain the same effect as that of the above-described image forming apparatus 10.

In the above-described embodiments, the configuration in which the carriage 200 moves in both the main scanning direction and the sub-scanning direction and the configuration in which the carriage moves in the main scanning direction and the sheet P moves in the sub-scanning direction are described as examples, but the configuration is not limited thereto. As long as the sheet P and the carriage can move relative to each other, a configuration in which the sheet P moves in both the main scanning direction and the sub-scanning direction or a configuration in which the sheet P moves in the main scanning direction and the carriage moves in the sub-scanning direction may be employed.

Next, an image forming apparatus 10b according to a second embodiment of the present disclosure is described. Redundant description that overlaps with the first embodiment is omitted as appropriate. The image forming apparatus 10b can perform so-called bidirectional printing in which an image is formed on each of a forward path which is the main scanning movement in +X direction (i.e., the forward main scanning movement) and a backward path which is the main scanning movement in the —X direction (i.e., the backward main scanning movement). The configuration of the image forming apparatus 10 or the image forming apparatus 10a described above can be applied to the image forming apparatus 10b.

Figure 9:
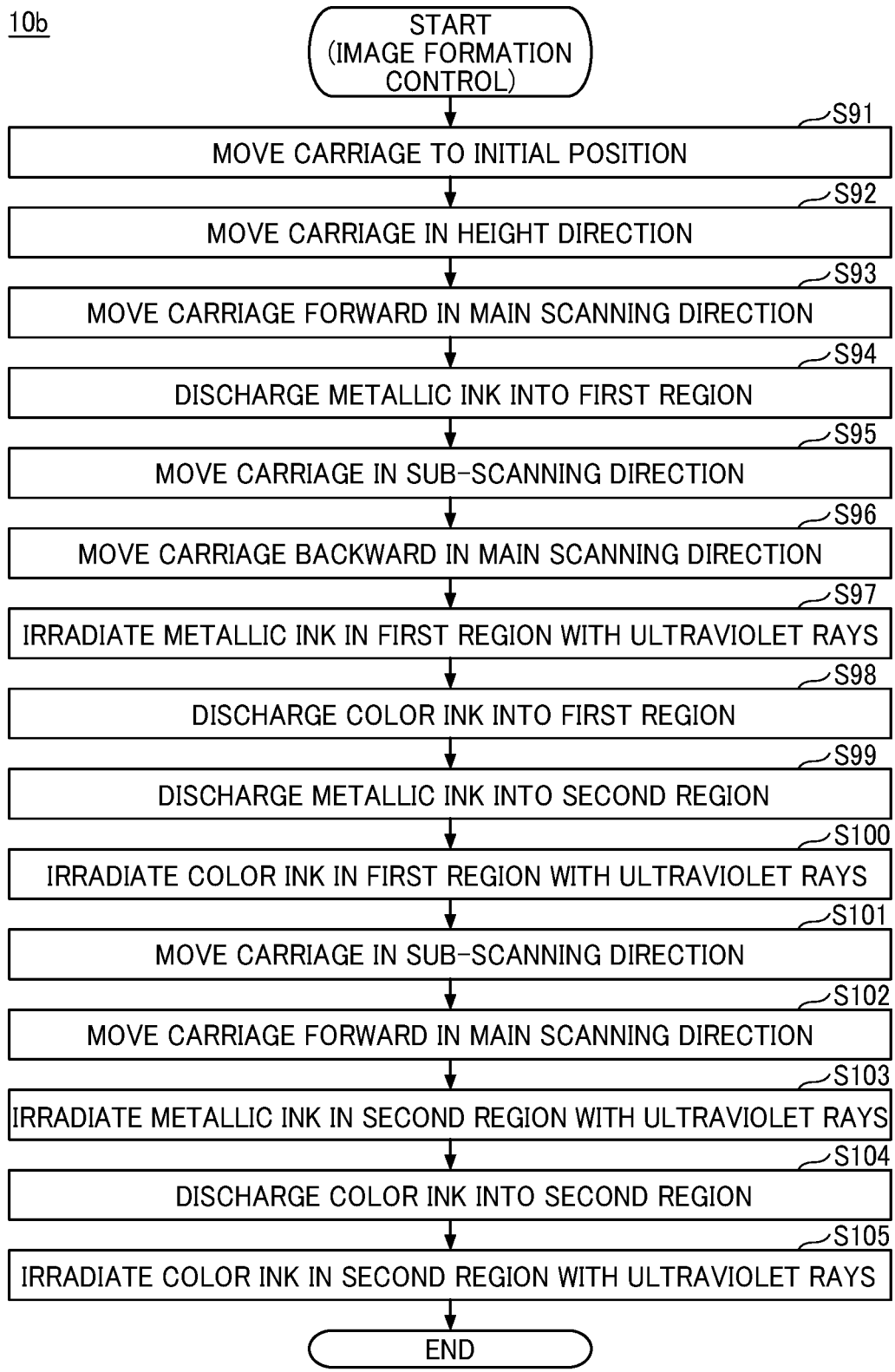
FIG. 9 is a flowchart illustrating an operation of the image forming apparatus according to another embodiment of the present disclosure.

Next, an operation of the image forming apparatus 10b is described with reference to FIG. 9. FIG. 9 is a flowchart illustrating an example of the operation of the image forming apparatus 10b. The operation of the image forming apparatus 10b illustrated in FIG. 9 is the same as that of the image forming apparatus 10 illustrated in FIG. 5 except that the second main scanning movement is changed from the forward main scanning movement to the backward main scanning movement. That is, in step S96, the image formation control unit 25 moves the carriage 200 backward in the main scanning direction as the second main scanning movement (i.e., the backward main scanning movement).

In the second main scanning movement, in step S97, the irradiation unit 400a irradiates the metallic ink discharged in the first region of the sheet P with ultraviolet rays. As a result, the metallic ink discharged in the first region of the sheet P is cured and fixed on the sheet P. In the second main scanning movement, in step S98, the color ink discharge head 301 discharges the color ink in the first region of the sheet P. In the second main scanning movement, in step S99, the metallic ink discharge head 300 discharges the metallic ink in a second region of the sheet P.

Further, in the second main scanning movement, in step S100, the irradiation unit 400b irradiates the color ink discharged in the first region of the sheet P with ultraviolet rays. As a result, the color ink discharged in the first region of the sheet P is cured and fixed on the sheet P. Thus, the image forming apparatus 10b can also form an image in the backward main scanning movement. That is, the image forming apparatus 10b alternately performing the forward main scanning movement and the backward main scanning movement to form an image on the sheet P by bidirectional printing.

As described above, in the present embodiment, the irradiation unit 400 includes the irradiation unit 400a (first irradiation unit) and the irradiation unit 400b (second irradiation unit), and the metallic ink discharge head 300 and the color ink discharge head 301 are disposed between the irradiation unit 400a and the irradiation unit 400b in the main scanning direction to form an image in each of the forward main scanning movement and the backward main scanning movement.

In the forward main scanning movement, which is the main scanning movement in +X direction, before the color ink discharge head 301 discharges the color ink, the irradiation unit 400b irradiates the metallic ink discharged onto the sheet P by the metallic ink discharge head 300 with ultraviolet rays to cure the metallic ink. Thereafter, the color ink discharge head 301 discharges the color ink in the region of the image formed of the metallic ink to form an image with the color ink.

In the backward main scanning movement, which is the main scanning movement in −X direction, before the color ink discharge head 301 discharges the color ink, the irradiation unit 400a irradiates the metallic ink discharged onto the sheet P by the metallic ink discharge head 300 with ultraviolet rays to cure the metallic ink. Thereafter, the color ink discharge head 301 discharges the color ink in the region of the image formed of the metallic ink to form an image with the color ink.

Thus, the image forming apparatus 10b can form an image by bidirectional printing. Note that other effects are equivalent to those described in the first embodiment.

Next, an image forming apparatus 10c according to a third embodiment of the present disclosure is described. The overall configuration of the image forming apparatus 10 or the image forming apparatus 10a described above can be applied to the image forming apparatus 10c. In the image forming apparatus 10c, the arrangement of the ink discharge heads and the irradiation units on the carriage is different from that of the image forming apparatus 10 or the image forming apparatus 10a.

Figure 10:
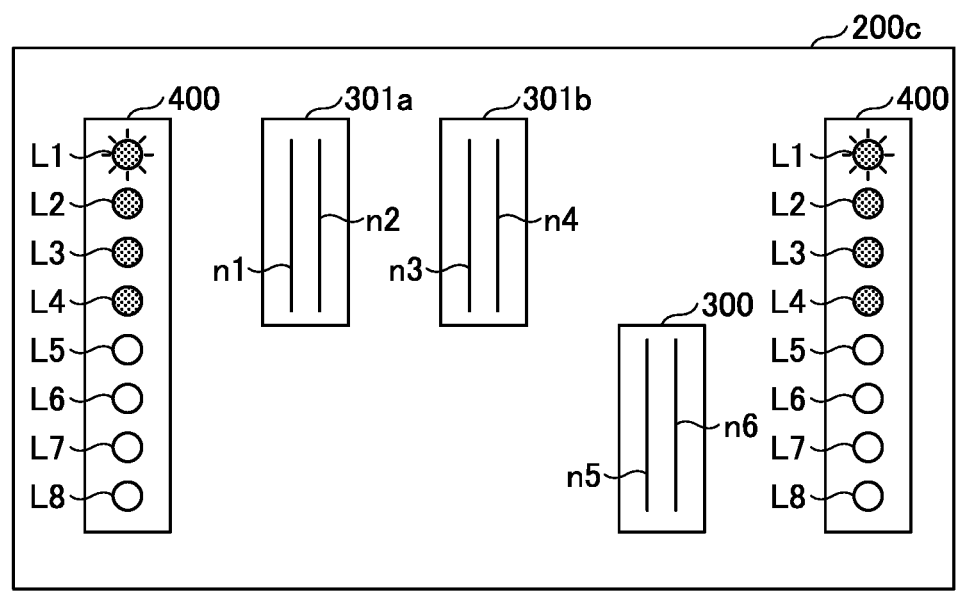
FIG. 10 is a plan view of a carriage according to yet another embodiment of the present disclosure.

FIG. 10 is a plan view of a carriage 200c of the image forming apparatus 10c. As illustrated in FIG. 10, two irradiation units 400 are mounted on the carriage 200c, and the metallic ink discharge head 300 and the color ink discharge heads 301a and 301b are disposed between the two irradiation units 400. The metallic ink discharge head 300 includes nozzle rows n5 and n6, the color ink discharge head 301a includes nozzle rows n1 and n2, and the color ink discharge head 301b includes nozzle rows n3 and n4.

The metallic ink discharge head 300 discharges the metallic ink in a first region in the former main scanning movement. The irradiation unit 400 includes multiple light sources L1 to L8 arranged in the Y-axis direction. The irradiation unit 400 emits ultraviolet rays using a part of the irradiation unit 400, that is, the light sources L1 to L4, which are half of the light sources L1 to L8 on −Y direction side, in the latter main scanning movement. The color ink discharge heads 301a and 301b discharge the color ink in the first region irradiated with ultraviolet rays by the light sources L1 to L4 of the irradiation unit 400. In the present embodiment, the irradiation unit 400 overlaps with the entire area including both the area where the metallic ink discharge head 300 is disposed and the area where the color ink discharge heads 301a and 301b are disposed in the Y-axis direction, that is, in the sub-scanning direction.

In the present embodiment, the image forming apparatus 10c may have a high-gloss image mode for outputting a high-gloss image and a non-high-gloss image mode for outputting a non-high-gloss image, which are switchable by a user. The controller 30 controls the irradiation unit 400 so as to switch the light sources L1 to L8 to be turned on or off according to the selected mode.

In the high-gloss image mode, the irradiation unit 400 does not use the light sources L5 to L8 that overlap with the area where the metallic ink discharge head 300 is disposed in the sub-scanning direction. The irradiation unit 400 uses only the light sources L1 to L4 that overlap with the area where the color ink discharge heads 301a and 301b are disposed in the sub-scanning direction to form an image. On the other hand, in the non-high-gloss image mode, all the light sources L1 to L8 included in the irradiation unit 400 are turned on to form an image. With this configuration, the image forming apparatus 10c can selectively output a high-gloss image and a non-high-gloss image in accordance with a user's desire, for example. Also with this configuration, the same effects as those of the first and second embodiments described above can be obtained.

The above-described embodiments are just examples and do not limit the present disclosure. Modifications and alterations of the embodiments can be made without departing from the spirit and scope of the embodiments of the present disclosure described in the claims unless limited in the above description.

Embodiments also include an image forming method. An image forming method includes discharging a metallic ink onto a recording medium, discharging a color ink onto the recording medium, irradiating the metallic ink on the recording medium with light, and alternately performing a main scanning movement and a sub-scanning movement. In the main scanning movement, positions where the metallic ink and the color ink are discharged and where the light is emitted are moved relative to the recording medium in a main scanning direction. In the sub-scanning movement, the positions where the metallic ink and the color ink are discharged and where the light is emitted are moved relative to the recording medium in a sub-scanning direction perpendicular to the main scanning direction. The image forming method further includes discharging the metallic ink in a region of the recording medium in a former main scanning movement, irradiating the region in which the metallic ink has been discharged, with the light in a latter main scanning movement after the former main scanning movement, and discharging the color ink in the region irradiated with the light. According to such an image forming method, the same effects as those of the above-described image forming apparatus can be obtained. Such an image forming method may be implemented by a circuit such as a CPU or a large-scale integration (LSI), an integrated circuit (IC) card, a single module, or the like.

Embodiments also include a non-transitory storage medium storing a program which, when executed by one or more processors, causes the one or more processors to perform the image forming method. For example, a non-transitory storage medium stores a program which, when executed by one or more processors, causes the one or more processors to perform an image forming method. The method includes discharging a metallic ink onto a recording medium, discharging a color ink onto the recording medium, irradiating the metallic ink on the recording medium with light, and alternately performing a main scanning movement and a sub-scanning movement. In the main scanning movement, positions where the metallic ink and the color ink are discharged and where the light is emitted are moved relative to the recording medium in a main scanning direction. In the sub-scanning movement, the positions where the metallic ink and the color ink are discharged and where the light is emitted are moved relative to the recording medium in a sub-scanning direction perpendicular to the main scanning direction. The image forming method further includes discharging the metallic ink in a region of the recording medium in a former main scanning movement, irradiating the region in which the metallic ink has been discharged, with the light in a latter main scanning movement after the former main scanning movement, and discharging the color ink in the region irradiated with the light. According to such a program for performing the image forming method, effects similar to those of the above-described image forming apparatus can be obtained.

In addition, the numbers such as ordinal numbers and quantities used in the above-described embodiments are all examples for specifically describing the technology of the present invention, and embodiments of the present invention are not limited to the exemplified numbers. In addition, the above-describe connections among the components are examples for specifically describing the technology of the present invention, and connections for implementing functions of the present invention are not limited to the above-described examples.

Further, division of functional blocks illustrated in the block diagram is an example, and a plurality of blocks may be implemented as one block, one block may be divided into a plurality of blocks, and/or some functions may be transferred to another block. Further, functions of a plurality of blocks having similar functions may be processed in parallel or in time division by a single piece of hardware or software.

As described above, according to the present disclosure, a colored and highly glossy image such as a metallic color image can be formed.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An image forming apparatus comprising:
a metallic ink discharge head configured to discharge a metallic ink onto a recording medium;
a color ink discharge head configured to discharge a color ink onto the recording medium;
an irradiation unit configured to irradiate the metallic ink on the recording medium with light;
a carriage on which the metallic ink discharge head, the color ink discharge head, and the irradiation unit are mounted; and
a moving unit configured to alternately perform a main scanning movement and a sub-scanning movement, the main scanning movement in which the carriage is moved relative to the recording medium in a main scanning direction, the sub-scanning movement in which the carriage is moved relative to the recording medium in a sub-scanning direction perpendicular to the main scanning direction,
wherein the metallic ink discharge head discharges the metallic ink in a region of the recording medium in a former main scanning movement,
wherein the metallic ink discharge head is disposed at a position shifted from the color ink discharge head in the sub-scanning direction,
wherein the irradiation unit irradiates the region in which the metallic ink has been discharged, with the light in a latter main scanning movement after the former main scanning movement, and
wherein the color ink discharge head discharges the color ink in the region irradiated with the light by the irradiation unit.

2. The image forming apparatus according to claim 1, wherein the metallic ink is ultraviolet curable.

3. The image forming apparatus according to claim 1, wherein the moving unit is configured to move the carriage relative to the recording medium by a predetermined distance in the sub-scanning movement, and
wherein the position of the metallic ink discharge head relative to the color ink discharge head is shifted from the color ink discharge head by an integral multiple of the predetermined distance in the sub-scanning direction.

4. The image forming apparatus according to claim 1, wherein the moving unit is configured to move the carriage relative to the recording medium by a predetermined distance in the sub-scanning movement, and
wherein the metallic ink discharge head is disposed at a position shifted from the irradiation unit by an integral multiple of the predetermined distance in the sub-scanning direction.

5. The image forming apparatus according to claim 1, wherein the irradiation unit and the color ink discharge head are arranged side by side in the main scanning direction while overlapping each other in the sub-scanning direction.

6. The image forming apparatus according to claim 5, wherein the irradiation unit includes a first irradiation unit and a second irradiation unit, and
wherein the color ink discharge head is disposed between the first irradiation unit and the second irradiation unit in the main scanning direction.

7. The image forming apparatus according to claim 6,
wherein the main scanning movement includes a forward main scanning movement in which the carriage is moved forward relative to the recording medium in the main scanning direction and a backward main scanning movement in which the carriage is moved backward relative to the recording medium in the main scanning direction, and
wherein the color ink discharge head is configured to discharge the color ink to form an image on the recording medium in each of the forward main scanning movement and the backward main scanning movement.

8. The image forming apparatus according to claim 1,
wherein at least one of the metallic ink or the color ink includes a solvent.

9. The image forming apparatus according to claim 1,
wherein at least one of the metallic ink or the color ink includes water.

10. An image forming method comprising:
discharging a metallic ink, by a metallic ink discharge head, onto a recording medium;
discharging a color ink, by a color ink discharge head, onto the recording medium;
irradiating the metallic ink on the recording medium with light;
alternately performing a main scanning movement and a sub-scanning movement, the main scanning movement in which positions where the metallic ink and the color ink are discharged and where the light is emitted are moved relative to the recording medium in a main scanning direction, the sub-scanning movement in which the positions where the metallic ink and the color ink are discharged and where the light is emitted are moved relative to the recording medium in a sub-scanning direction perpendicular to the main scanning direction, wherein the metallic ink discharge head is disposed at a position shifted from the color ink discharge head in the sub-scanning direction;
discharging the metallic ink in a region of the recording medium in a former main scanning movement;
irradiating the region in which the metallic ink has been discharged, with the light in a latter main scanning movement after the former main scanning movement; and
discharging the color ink in the region irradiated with the light.

11. A non-transitory storage medium storing a program which, when executed by one or more processors, causes the one or more processors to perform a method, the method comprising:
discharging a metallic ink, by a metallic ink discharge head, onto a recording medium;
discharging a color ink, by a color ink discharge head, onto the recording medium;
irradiating the metallic ink on the recording medium with light;
alternately performing a main scanning movement and a sub-scanning movement, the main scanning movement in which positions where the metallic ink and the color ink are discharged and where the light is emitted are moved relative to the recording medium in a main scanning direction, the sub-scanning movement in which the positions where the metallic ink and the color ink are discharged and where the light is emitted are moved relative to the recording medium in a sub-scanning direction perpendicular to the main scanning direction, wherein the metallic ink discharge head is disposed at a position shifted from the color ink discharge head in the sub-scanning direction;
discharging the metallic ink in a region of the recording medium in a former main scanning movement;
irradiating the region in which the metallic ink has been discharged, with the light in a latter main scanning movement after the former main scanning movement; and
discharging the color ink in the region irradiated with the light.

\* \* \* \* \*